US008511096B1

(12) United States Patent  
Haugen et al.

(10) Patent No.: US 8,511,096 B1
(45) Date of Patent: Aug. 20, 2013

(54) HIGH BLEED FLOW MUFFLING SYSTEM

(75) Inventors: Christina Granger Morrissey Haugen, Monroe, OH (US); Kevin Samuel Klasing, Springboro, OH (US); Christopher Jon Potokar, Loveland, OH (US); Robert Proctor, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/448,470

(22) Filed: Apr. 17, 2012

(51) Int. Cl.
*F02C 7/045* (2006.01)
(52) U.S. Cl.
USPC .............................. 60/785; 60/782; 181/213
(58) Field of Classification Search
USPC ................... 60/725, 782, 785, 795; 181/213, 181/214, 220; 244/1 N
See application file for complete search history.

(56) References Cited

U.S. PATENT DOCUMENTS

| 700,785 | A | 5/1902 | Kull |
| 1,473,349 | A | 11/1923 | Kach |
| 1,539,595 | A | 5/1925 | Powell |
| 1,697,794 | A | 1/1929 | Stranahan |
| 1,794,276 | A | 2/1931 | Bowes |
| 2,701,557 | A | 2/1955 | Ramey |
| 2,919,761 | A | 1/1960 | Smith |
| 2,929,248 | A | 3/1960 | Sprenkle |
| 3,016,972 | A | 1/1962 | Dugas |
| 3,092,206 | A | 6/1963 | Moreau |
| 3,105,570 | A | 10/1963 | Bezemes |
| 3,120,877 | A | 2/1964 | Morris et al. |
| 3,159,238 | A | 12/1964 | Shearer |
| 3,191,630 | A | 6/1965 | Demyan |
| 3,338,331 | A | 8/1967 | Jettinghoff |
| 3,398,881 | A | 8/1968 | Greenberg et al. |
| 3,493,169 | A | 2/1970 | Abild et al. |
| 3,572,391 | A | 3/1971 | Hirsch |

(Continued)

FOREIGN PATENT DOCUMENTS

| EP | 2136053 | 12/2009 |
| EP | 2184447 | 12/2010 |
| EP | 2184448 | 12/2010 |

OTHER PUBLICATIONS

Phong et al., "Noise Reduction of a Turbofan Bleed Valve," 50th AIAA Aerospace Sciences Meeting, Nashville, Tennessee, Jan. 9-12, 2012.

(Continued)

*Primary Examiner* — William H Rodriguez
*Assistant Examiner* — Scott Walthour
(74) *Attorney, Agent, or Firm* — General Electric Company; Matthew P. Hayden; David J. Clement

(57) ABSTRACT

High bleed flow muffling systems are disclosed. Example muffling devices according to at least some aspects of the present disclosure may include a first orifice plate and a second orifice plate at least partially defining a plenum arranged to receive the flow of a compressible fluid. The first orifice plate and the second orifice plate may be arranged to produce cross-impinging flow such that flow through the orifices of the first orifice plate into the plenum is directed at the wall of the second orifice plate and such that flow through the orifices of the second orifice plate is directed at the wall of the first orifice plate. Some example embodiments may include an inlet flow restrictor disposed upstream of the first and second orifice plates.

21 Claims, 10 Drawing Sheets

(56) References Cited

U.S. PATENT DOCUMENTS

| | | |
|---|---|---|
| 3,632,223 A | 1/1972 | Hampton |
| 3,665,965 A | 5/1972 | Baumann |
| 3,692,140 A | 9/1972 | Smith |
| 3,777,489 A | 12/1973 | Johnson et al. |
| 3,840,051 A | 10/1974 | Akashi et al. |
| 3,945,759 A | 3/1976 | Bobo |
| 3,951,566 A | 4/1976 | Mattei et al. |
| 3,964,519 A | 6/1976 | De Baun |
| 4,022,112 A | 5/1977 | Putt et al. |
| 4,113,050 A | 9/1978 | Smith |
| 4,128,769 A | 12/1978 | Bons et al. |
| 4,130,173 A | 12/1978 | Cooksey |
| 4,132,285 A | 1/1979 | Milde et al. |
| 4,142,413 A | 3/1979 | Bellinga |
| 4,156,344 A | 5/1979 | Cuthbertson et al. |
| 4,177,780 A | 12/1979 | Pellerin |
| 4,244,440 A | 1/1981 | Matta et al. |
| 4,244,441 A | 1/1981 | Tolman |
| 4,375,841 A | 3/1983 | Vielbig |
| 4,463,552 A | 8/1984 | Monhardt et al. |
| 4,537,277 A | 8/1985 | Bryce |
| 4,610,326 A | 9/1986 | Kirchweger et al. |
| 4,685,533 A | 8/1987 | Piesik |
| 4,890,691 A * | 1/1990 | Ching-ho ............... 181/264 |
| 4,979,587 A | 12/1990 | Hirt et al. |
| 5,205,719 A | 4/1993 | Childs et al. |
| 5,261,228 A | 11/1993 | Shuba |
| 5,266,754 A | 11/1993 | Swift |
| 5,327,941 A | 7/1994 | Bitsakis et al. |
| 5,428,954 A | 7/1995 | Cowan, Sr. |
| 5,429,102 A | 7/1995 | Edwards et al. |
| 5,495,872 A | 3/1996 | Gallagher et al. |
| 5,557,917 A | 9/1996 | Jaw |
| 5,758,488 A | 6/1998 | Batey |
| 6,145,544 A | 11/2000 | Dutertre et al. |
| 6,405,492 B1 | 6/2002 | Scheid |
| 6,415,747 B1 | 7/2002 | Asano et al. |
| 6,558,137 B2 | 5/2003 | Tomell et al. |
| 6,565,313 B2 | 5/2003 | Nikkanen et al. |
| 6,588,195 B2 | 7/2003 | Negulescu |
| 6,695,094 B2 | 2/2004 | Moffat et al. |
| 6,776,589 B2 | 8/2004 | Tomell et al. |
| 6,880,579 B2 | 4/2005 | Boger |
| 7,089,963 B2 | 8/2006 | Meheen |
| 7,146,961 B1 | 12/2006 | Westcott |
| 7,210,912 B2 | 5/2007 | Tomell et al. |
| 7,267,297 B2 | 9/2007 | Campbell et al. |
| 7,344,107 B2 | 3/2008 | Campbell et al. |
| 7,364,116 B2 | 4/2008 | Nguyen et al. |
| 7,367,424 B2 | 5/2008 | Brown et al. |
| 7,387,188 B2 | 6/2008 | Keller et al. |
| 7,431,125 B2 | 10/2008 | Williams |
| 7,448,469 B2 | 11/2008 | Seyler et al. |
| 7,513,119 B2 | 4/2009 | Zielinski et al. |
| 7,611,093 B2 | 11/2009 | Campbell et al. |
| 7,730,995 B2 | 6/2010 | Hunt et al. |
| 7,762,374 B2 | 7/2010 | Turner et al. |
| 7,765,784 B2 | 8/2010 | Lwasa et al. |
| 7,797,945 B2 | 9/2010 | Appleby et al. |
| 7,798,285 B2 | 9/2010 | Chiou et al. |
| 7,891,605 B2 | 2/2011 | Nguyen et al. |
| 8,016,071 B1 | 9/2011 | Martinus et al. |
| 2004/0238123 A1 | 12/2004 | Becknell |
| 2005/0067218 A1 | 3/2005 | Bristow et al. |
| 2010/0043447 A1 | 2/2010 | Kirby |
| 2010/0236256 A1 | 9/2010 | Hussain et al. |
| 2010/0263964 A1 * | 10/2010 | Kosaka et al. ............ 181/214 |
| 2011/0265490 A1 | 11/2011 | Klasing et al. |
| 2012/0006615 A1 | 1/2012 | Klasing et al. |

OTHER PUBLICATIONS

US 7,270,294, 09/2007, Campbell (withdrawn).
GB Search Report and Opinion issued Oct. 26, 2011, in corresponding U.S. Appl. No. 13/178,159.

* cited by examiner

HIGH BLEED FLOW MUFFLING SYSTEM

BACKGROUND

The subject matter disclosed herein relates generally to muffling systems, and, more specifically, to muffling devices capable of providing pressure drops, acoustic improvements, and desirable flow properties.

In a gas turbine engine, air is pressurized in a compression module. The air channeled through the compression module is mixed with fuel in a combustor and ignited, generating hot combustion gases, which flow through turbine stages that extract energy therefrom for powering the fan and compressor rotors and generate engine thrust to propel an aircraft in flight or to power a load, such as an electrical generator.

In some gas turbine engines, a portion of the high-pressure air, such as, for example, bleed air from a compressor, may be extracted or bled from the compressor for various needs. These needs include, for example, compressor flow bleeding which may be used to improve operability as well as to provide turbine cooling, bearing sump pressurization, purge air, or aircraft environment control. The air may be bled off from the compressor using bleed slots located over specific portions or stages of the compressor.

In least some gas turbine engines, during engine operation occurring in some operating conditions, the compressor may pump more air than is required for needs including the combustion process. In order to manage operability of the engine and combustion performance, a portion of the excess bleed air from the compressor may be routed through bleed conduits and exhausted into the fan flow stream, engine exhaust, or to ambient. The pressure and temperature of the air stream bled from the compressor may be very high. For example, bleed air pressure may be greater than about 1375 kPa and the bleed air temperature may be greater than about 538 degrees C. A transient bleed valve system (TBV) system is sometimes used for bleeding and exhausting the air removed from the compressor. For example, the exhaust area of some conventional bleed systems may be oversized to lower the flow velocity at the exhaust location to assure that the acoustic requirements are met for the application. The exhaust area, as well as the relatively gently expansions between the source pressure and exhaust, may contribute to the relatively large size and/or weight of these systems.

The problem: In some applications (e.g., aircraft), it may be undesirable to use large and/or heavy components to reduce noise generated by bleed air and/or to direct bleed air into a fan flow stream or other locations.

BRIEF DESCRIPTION

At least one solution for the above-mentioned problem(s) is provided by the present disclosure to include example embodiments, provided for illustrative teaching and not meant to be limiting.

An example muffling device according to at least some aspects of the present disclosure may include a muffling device body including an inlet (which may include an inlet flow restrictor) arranged to direct a flow of a compressible fluid into an interior of the muffling device body; a first orifice plate arranged to receive at least some of the flow of the compressible fluid from the interior of the muffling device body, the first orifice plate including at least one orifice extending through a wall; and/or a second orifice plate arranged to receive at least some of the flow of the compressible fluid from the interior of the muffling device body, the second orifice plate including at least one orifice extending through a wall. The first orifice plate and the second orifice plate may at least partially define a plenum arranged to receive the flow of the compressible fluid from the interior of the muffling device body via the orifice of the first orifice plate and via the orifice of the second orifice plate. The first orifice plate and the second orifice plate may be fluidicly opposed such that the flow of the compressible fluid through the orifice of the first orifice plate from the interior of the muffling device body into the plenum is directed at the wall of the second orifice plate and such that flow of the compressible fluid through the orifice of the second orifice plate from the interior of the muffling device body into the plenum is directed at the wall of the first orifice plate.

An example gas turbine engine according to at least some aspects of the present disclosure may include a compressor; a combustor arranged to combust fuel in compressed air received from the compressor; a turbine configured to receive hot, pressurized gas from the combustor and to drive the compressor; and a bleed air system. The bleed air system may include a bleed conduit arranged to withdraw bleed air from the compressor and a muffling device arranged to discharge the bleed air. The muffling device may include an inlet (which may include an inlet flow restrictor) fluidicly coupled to receive the bleed air from the bleed conduit, a first generally planar orifice plate and a second generally planar orifice plate arranged generally in parallel to direct the bleed air in a cross-impinging flow into a plenum, and an outlet arranged to discharge the bleed air from the plenum.

An example method of operating a muffling device according to at least some aspects of the present disclosure may include receiving a flow of a compressible fluid into an interior of a muffling device body of a muffling device via an inlet (which may include an inlet flow restrictor). The method may include directing the flow of the compressible fluid from the interior of the muffling device body into a plenum at least partially defined by substantially parallel first and second orifice plates, including directing a first portion of the flow of the compressible fluid from the interior of the muffling device into the plenum through at least one orifice extending through the first orifice plate generally towards a wall of the second orifice plate, and directing a second portion of the flow of the compressible fluid from the interior of the muffling device into the plenum through at least one orifice extending through the second orifice plate generally towards a wall of the first orifice plate. The method may include discharging the flow of the compressible fluid from the plenum via an outlet.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
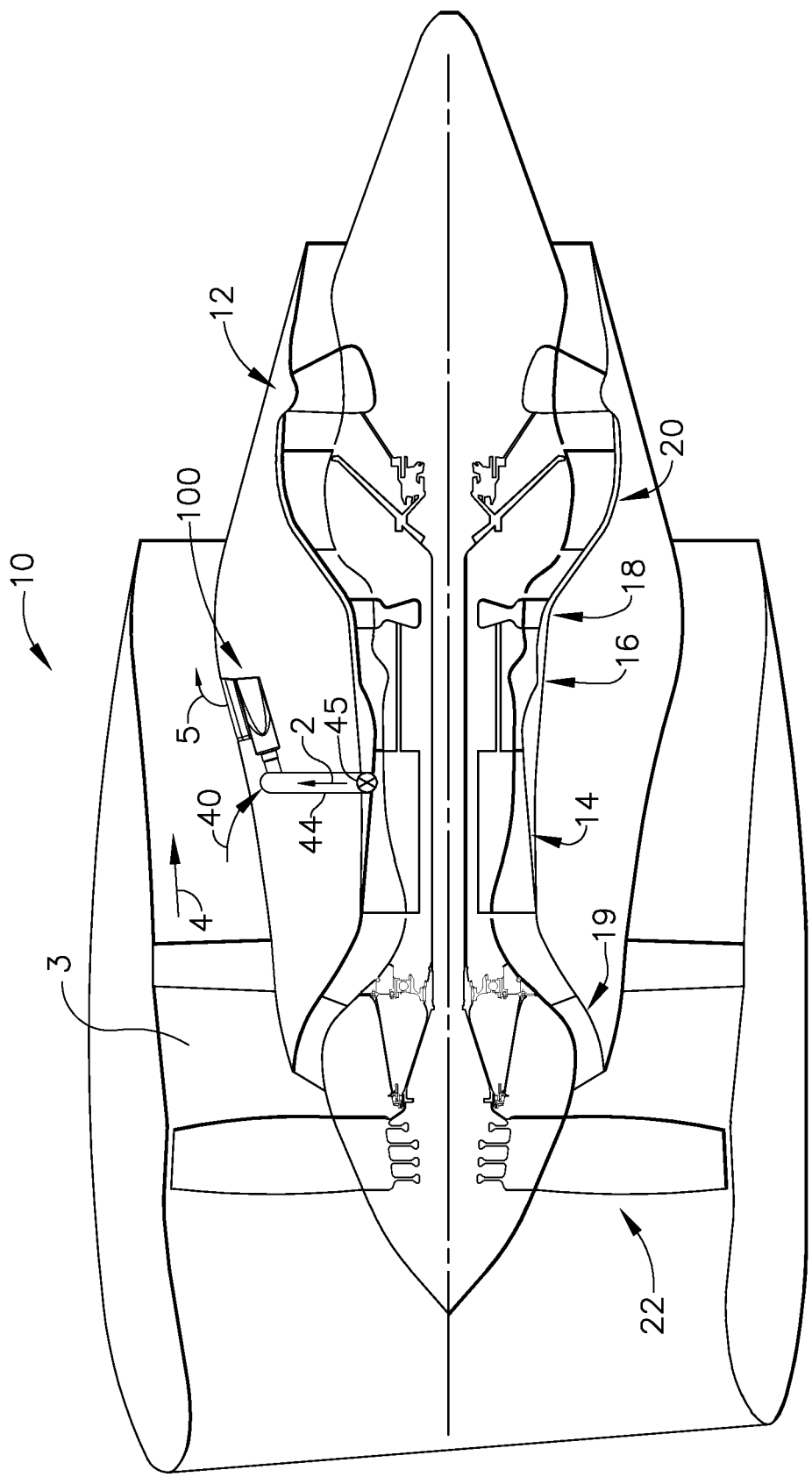
FIG. 1 is a schematic cross-sectional view of a gas turbine engine including an example muffling device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, gas turbine engines, muffling devices, and methods of operating muffling devices.

FIG. 1 is a schematic cross-sectional view of a gas turbine engine (GTE) 10 including an example muffling device 100, according to at least some aspects of the present disclosure. GTE 10 may include a bleed system 40, which may incorporate muffling device 100. GTE 10 may include a core gas turbine engine 12 that includes a high-pressure compressor 14, a combustor 16, and/or a high-pressure turbine 18. GTE 10 may also include a low-pressure compressor 19, a low-pressure turbine 20, and/or a fan assembly 22.

In operation, air may flow through fan assembly 22. A portion of the air discharged from fan assembly 22 may be channeled to high-pressure compressor 14, where it may be further compressed and channeled to combustor 16. Products of combustion from combustor 16 may be utilized to drive high-pressure turbine 18 and/or low-pressure turbine 20. Another portion of the air discharged from fan assembly 22 may bypass core gas turbine engine 10 (e.g., via fan duct 3) and/or may be referred to as a fan flow stream 4.

At some operating conditions, a portion of the compressed air produced by high-pressure compressor 14 may be routed through bleed system 40, thereby becoming bleed air 2. Bleed air 2 from high-pressure compressor 14 may enter a bleed flow conduit 44. Bleed air 2 may pass through bleed flow conduit 44 and enter muffling device 100, which may direct bleed air 2 into a flow path, such as the fan flow stream 4. Flow of bleed air 2 through bleed flow conduit 44 may be controlled by a transient bleed valve 45. Muffling device 100, described in more detail herein below, may be in flow communication with bleed flow conduit 44 such that the bleed air 2 is discharged as exit flow stream 5 into a flow path, such as a fan duct 3 and mixes the air with another flow, such as fan flow stream 4. Some example embodiments may include a flow mixing vent system, such as an aero chimney, as described in U.S. Patent Application Publication No. 2011/0265490, which is incorporated herein by reference. An aero chimney and/or other plume control device may be arranged to prevent exit flow 5 from impacting temperature sensitive materials (e.g., materials capable of withstanding only relatively low temperatures). Some example embodiments may be used in connection with louver systems, such as those described in co-pending U.S. patent application Ser. No. 13/448,517, filed on Apr. 17, 2012, which is titled "MODULAR LOUVER SYSTEM," and which is incorporated herein by reference.

Figure 2:
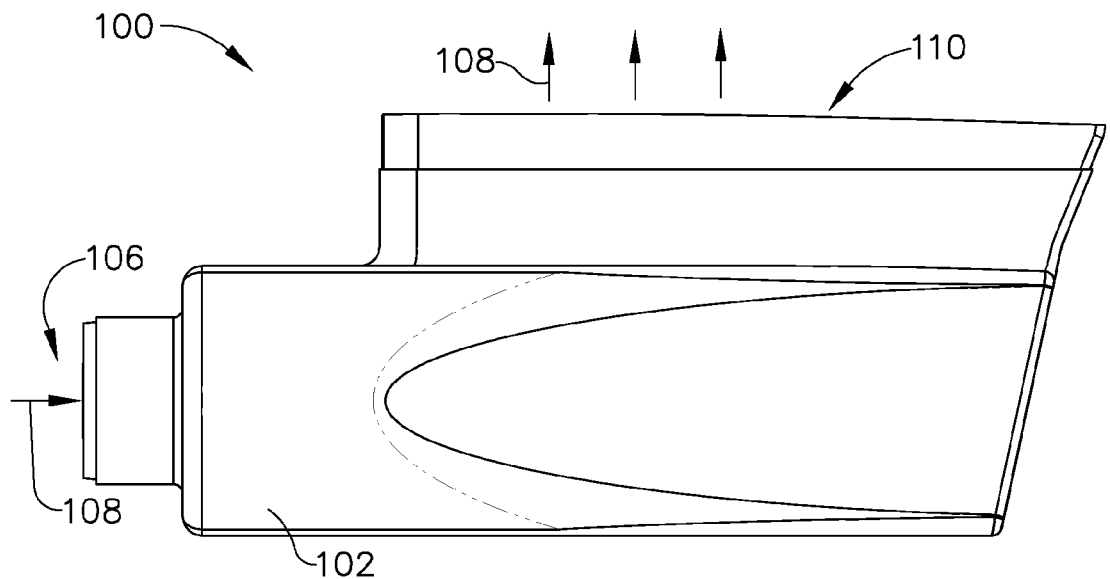
FIG. 2 is an elevation view of an example muffling device.

FIG. 2 is an elevation view of an example muffling device 100, according to at least some aspects of the present disclosure. Muffling device 100 may include a muffling device body 102. Muffling device 100 may be configured to receive a flow 108 of a compressible fluid into muffling device body 102 via an inlet 106 and/or may be configured to discharge flow 108 from muffling device body 102 via an outlet 110. For example, inlet 106 of muffling device 100 may receive bleed air 2 from bleed conduit 44 and/or may discharge bleed air 2 (as exit flow stream 5) via outlet 110 into fan flow stream 4 (see, e.g., FIG. 1). In some example embodiments, muffling device 100 may be arranged generally in an L-shape, with inlet 106 receiving flow 108 generally in a horizontal direction and outlet 110 discharging flow 108 generally in a vertical direction. In some example embodiments, inlet 106 may include a generally circular, horizontally facing opening and/or outlet 110 may include an elongated, generally rectangular, vertically facing opening.

Figure 3:
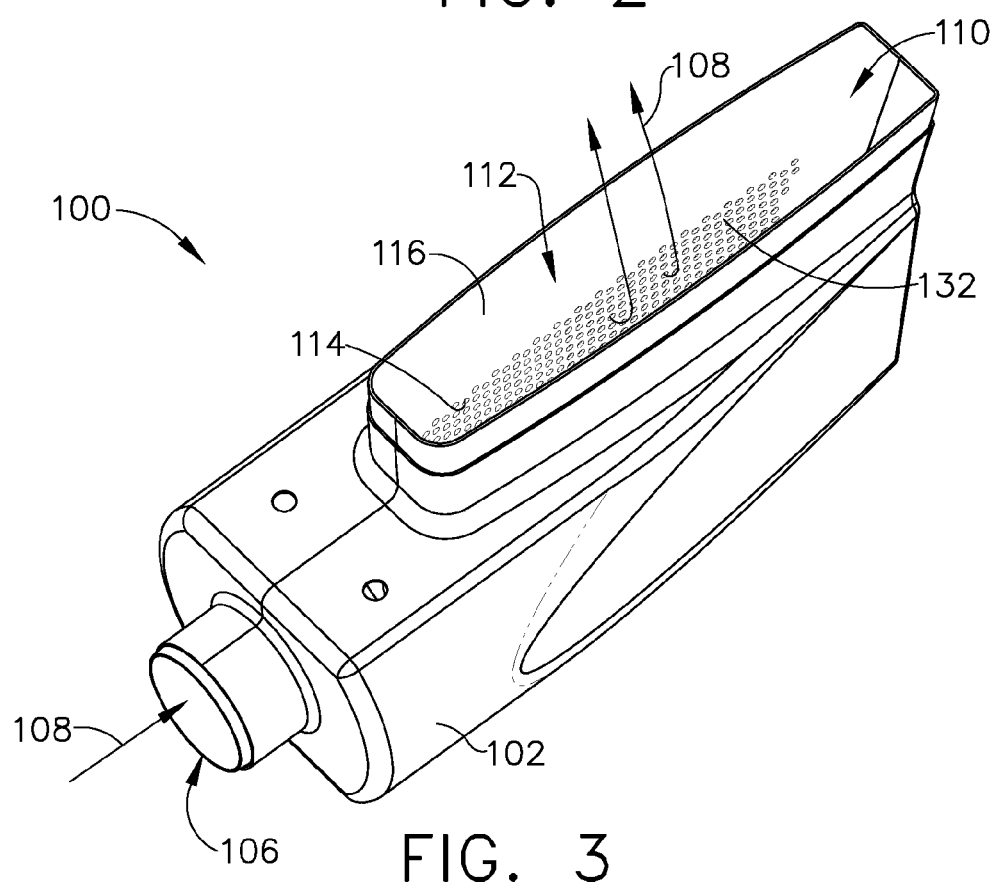
FIG. 3 is an isometric view of an example muffling device.

FIG. 3 is an isometric view of an example muffling device 100, according to at least some aspects of the present disclosure. Muffling device 100 may include a plenum 112 fluidicly connected to outlet 110. Plenum 112 may be disposed at least partially within muffling device body 102. Plenum 112 may be at least partially defined by a first orifice plate 116 and/or a second orifice plate 120 (see, e.g., FIG. 6), which may be generally planar and/or may be arranged generally in parallel. Orifice plate 116 may include a wall 132 through which orifices 114 may extend and/or orifice plate 120 may include a wall 134 through which orifices 118 may extend (see, e.g., FIG. 6). At least a portion of flow 108 may enter plenum 112 via orifices 114 and/or at least a portion of flow 108 may enter plenum 112 via orifices 118. Flow 108 may exit plenum 112 via outlet 110.

Figure 4:
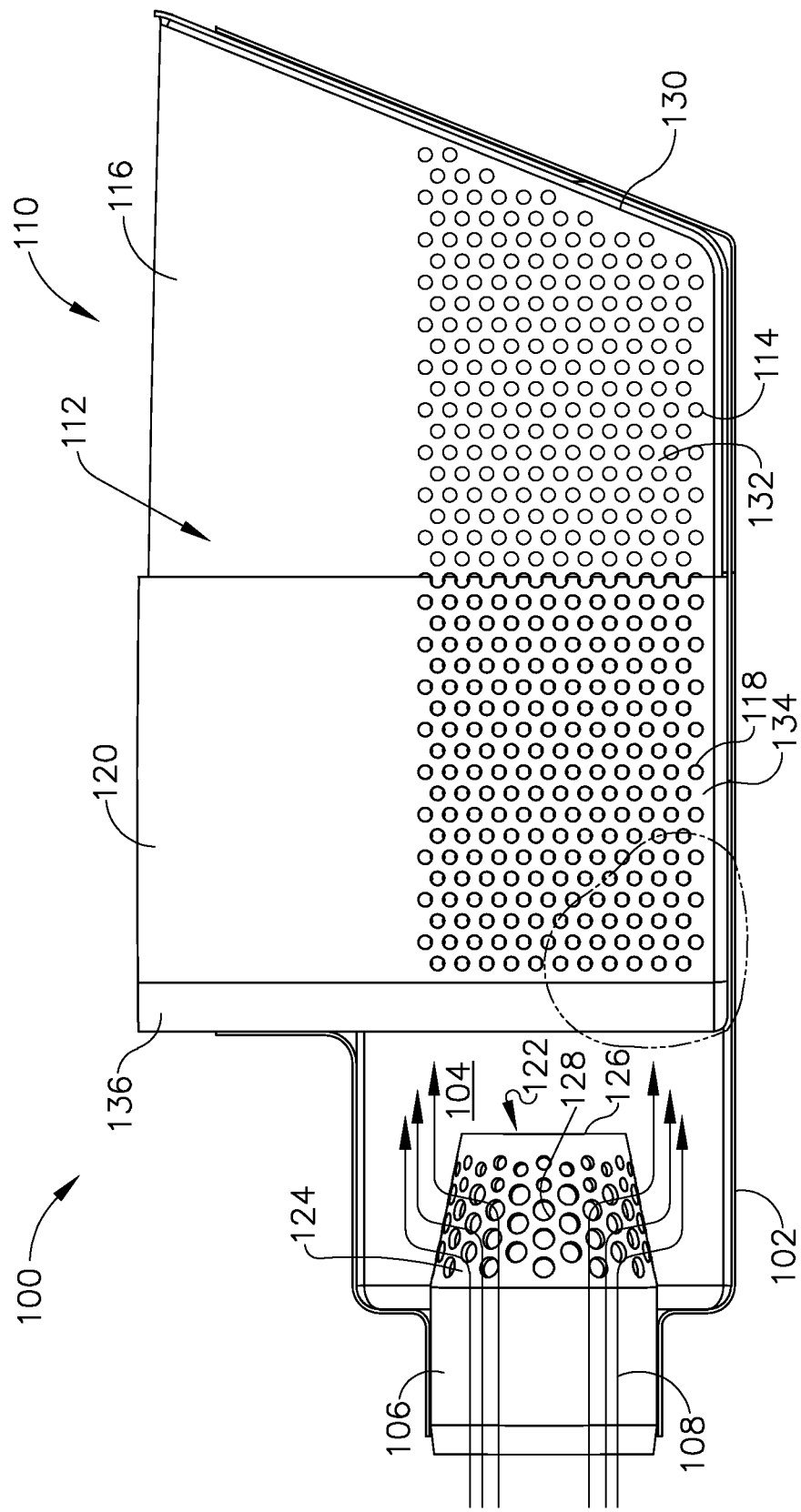
FIG. 4 is a partial cross-sectional view of an example muffling device.

FIG. 4 is a partial cross-sectional view of an example muffling device 100, according to at least some aspects of the present disclosure. Muffling device 100 may include an inlet flow restrictor 122, which may be disposed fluidicly downstream of inlet 106 and/or fluidicly upstream of an interior 104 of muffling device body 102. In some example embodiments, inlet flow restrictor 122 may include a generally conical frustrum including a side wall 124 and/or a downstream end wall 126. Inlet flow restrictor 122 may taper inwardly in a generally downstream direction. Side wall 124 may include a plurality of holes 128 extending through the side wall. Holes 128 may be arranged to direct flow 108 of the compressible fluid received via inlet 106 into interior 104 of muffling device body 102. Some example embodiments may include holes 128 having substantially uniform sizes and/or having a plurality of different sizes. In some example embodiments, adjacent rows of holes 128 may be offset and/or staggered, which may improve flow uniformity.

In some example embodiments, inlet flow restrictor 122 may be configured to create a choked condition at a design flow rate. For example, the number, size, and/or spacing of holes 128 and/or the length of inlet flow restrictor 122 may be selected to provide a choked flow condition and/or to achieve acoustic characteristics. In some example embodiments, inlet flow restrictor may operate as a secondary flow restrictor, secondary to transient bleed valve 45 (FIG. 1). In some example embodiments, downstream end wall 126 may be substantially solid (e.g., without holes). In some example embodiments, downstream end wall 126 may include one or more holes.

Figure 12:
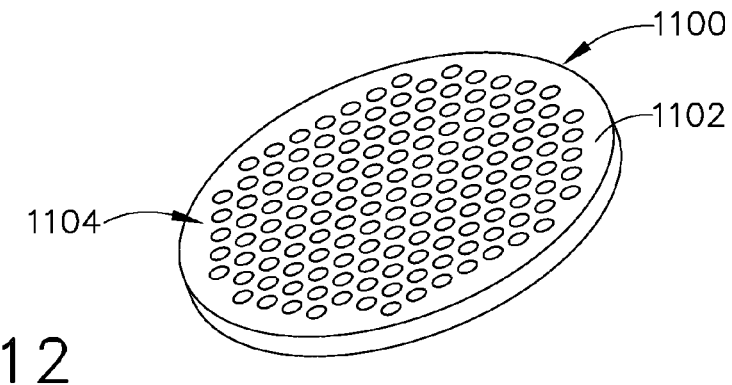
FIG. 12 is an isometric view of an alternative inlet flow restrictor comprising a substantially planar orifice plate.
Figure 13:
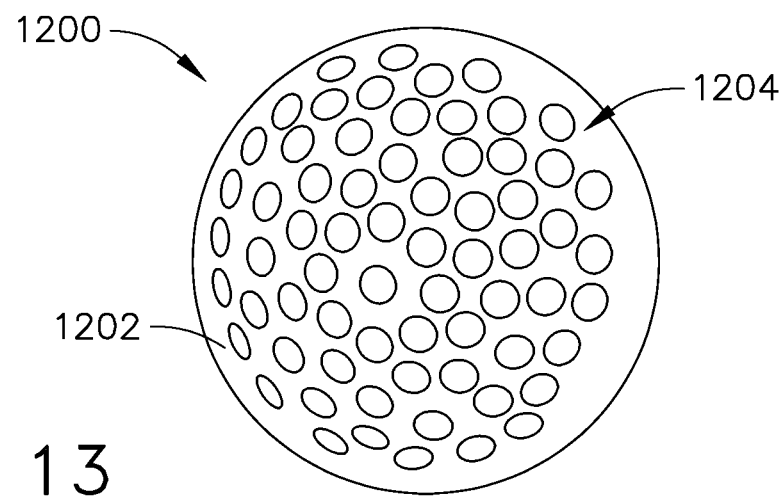
FIG. 13 is an isometric view of an alternative inlet flow restrictor comprising a generally hemispherical shape.
Figure 14:
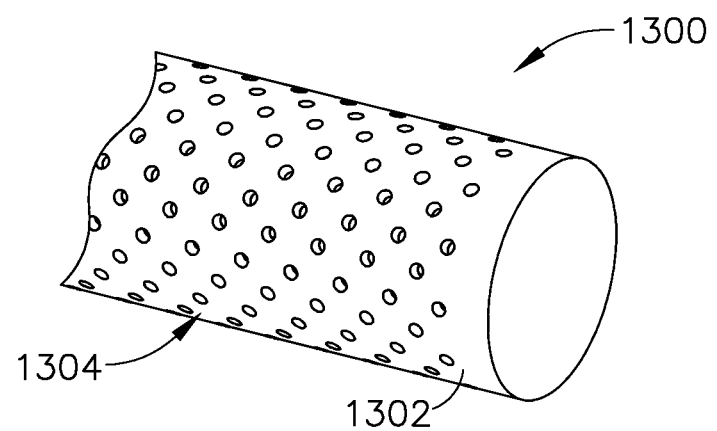
FIG. 14 is an isometric view of an alternative inlet flow restrictor comprising a generally tubular shape, all in accordance with at least some aspects of the present disclosure.

Although some example embodiments described herein incorporate a basket-type inlet flow restrictor, it is within the scope of the disclosure to use alternative inlet flow restrictors. FIG. 12 is an isometric view of an alternative inlet flow restrictor 1100, which may comprise a substantially planar orifice plate 1102 with a plurality of orifices 1104 extending therethrough. Orifices 1104 may be arranged in a generally staggered arrangement. FIG. 13 is an isometric view of an alternative inlet flow restrictor 1200, which may comprise a generally hemispherical shape 1202 with a plurality of orifices 1204 extending therethrough. Orifices 1204 may be arranged in a generally staggered arrangement. FIG. 14 is an isometric view of an alternative inlet flow restrictor 1300, which may comprise a generally tubular shape 1302 with a plurality of orifices 1304 extending therethrough. Orifices 1304 may be arranged in a generally staggered arrangement.

In some example embodiments, plenum 112 may be at least partially defined by a downstream end wall 130 and/or an upstream end wall 136 (see, e.g., FIG. 4). Downstream end wall 130 may be angled arranged such that plenum 112 tapers outwardly in a direction generally towards outlet 110. In connection with orifice plate 116 (having orifices 114 through wall 132) and/or orifice plate 120 (having holes 118 through wall 134), upstream end wall 136 and/or downstream end wall 130 may at least partially define plenum and/or may fluidicly interpose interior 104 and plenum 112.

Figure 5:
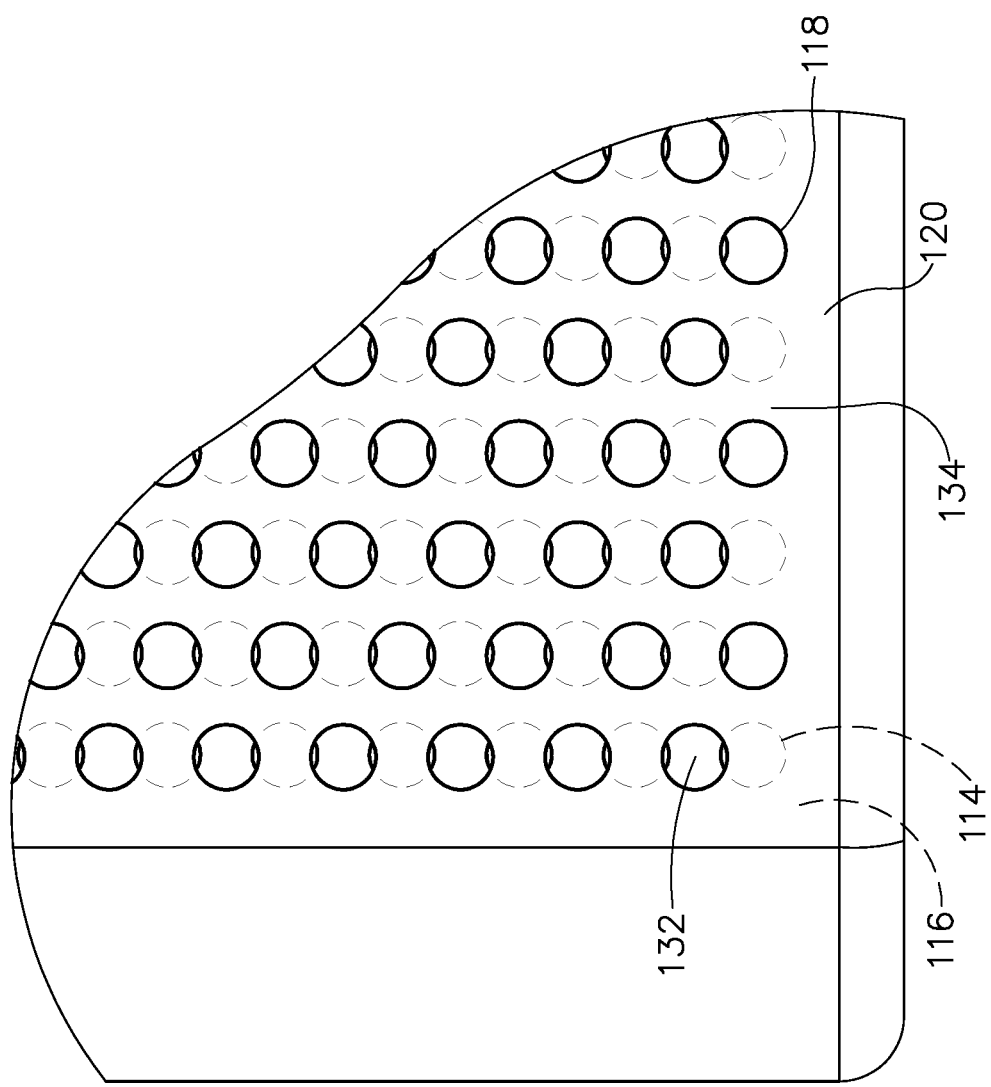
FIG. 5 is a detailed view of example cross-impinging orifice plates.
Figure 9:
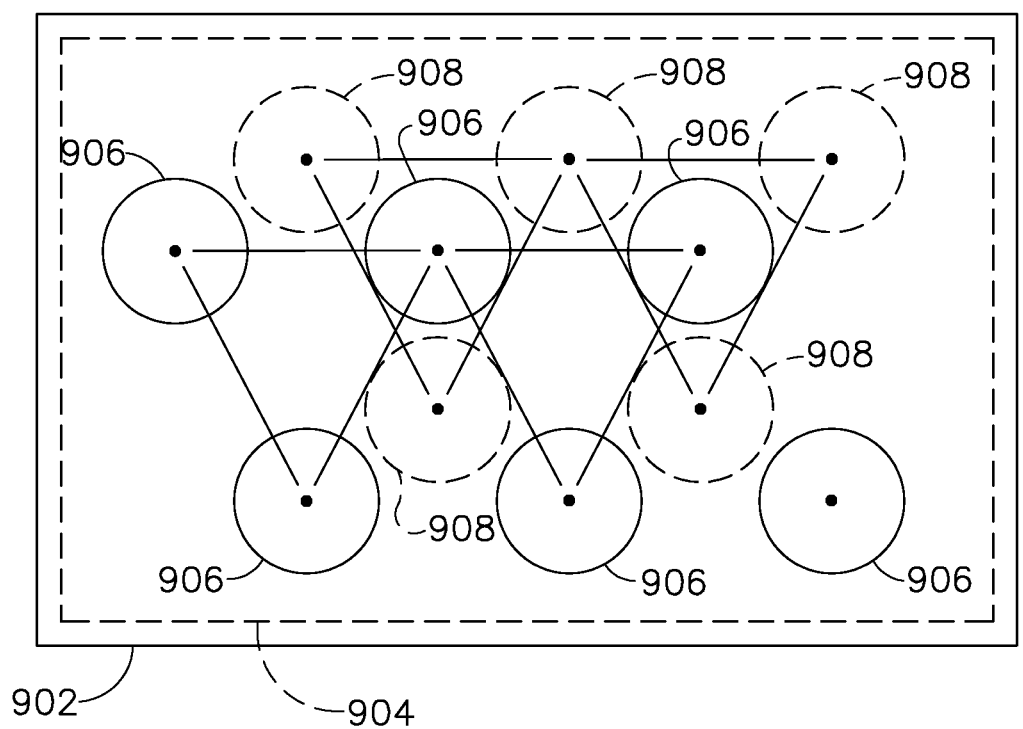
FIG. 9 is a detailed view of example cross-impinging orifice plates.

FIG. 5 is a detailed view of example cross-impinging orifice plates 116, 120, according to at least some aspects of the present disclosure. Orifices 114 through orifice plate 116 may be offset (e.g., not coaxial) with respect to orifices 118 through orifice plate 120. For example, orifices 114 may be arranged relative to orifices 118 such that flow through orifices 114 of first orifice plate 116 may be directed at wall 134 of second orifice plate 120 and/or such that flow through orifices 118 of second orifice plate 120 may be directed at wall 132 of first orifice plate. Such a flow arrangement may be referred to as cross-impinging. In some example embodiments, there may be no "line-of-sight" through orifices 114 of first orifice plate 116 and orifices 118 of second orifice plate 120. In various embodiments, the sizes and arrangement of orifices 114 of first orifice plate 116 and/or orifices 118 of second orifice plate 120 may be configured to achieve desired flow and/or acoustic characteristics. For example, diameters of orifices 114, 118, spacing between orifices 114, 118, and/or relative positions of orifices 114, 118 may be tuned to achieve desired flow and/or acoustic characteristics. See, for example, FIG. 9, which is a detailed view of example cross-impinging orifice plates 902, 904, according to at least some aspects of the present disclosure. Orifice plate 902 may include orifices 906 and/or orifice plate 904 may include orifices 908. As illustrated, orifices 906 and orifices 908 may each be arranged in a triangular pattern, and orifices 906 may be offset from orifices 908.

Figure 6:
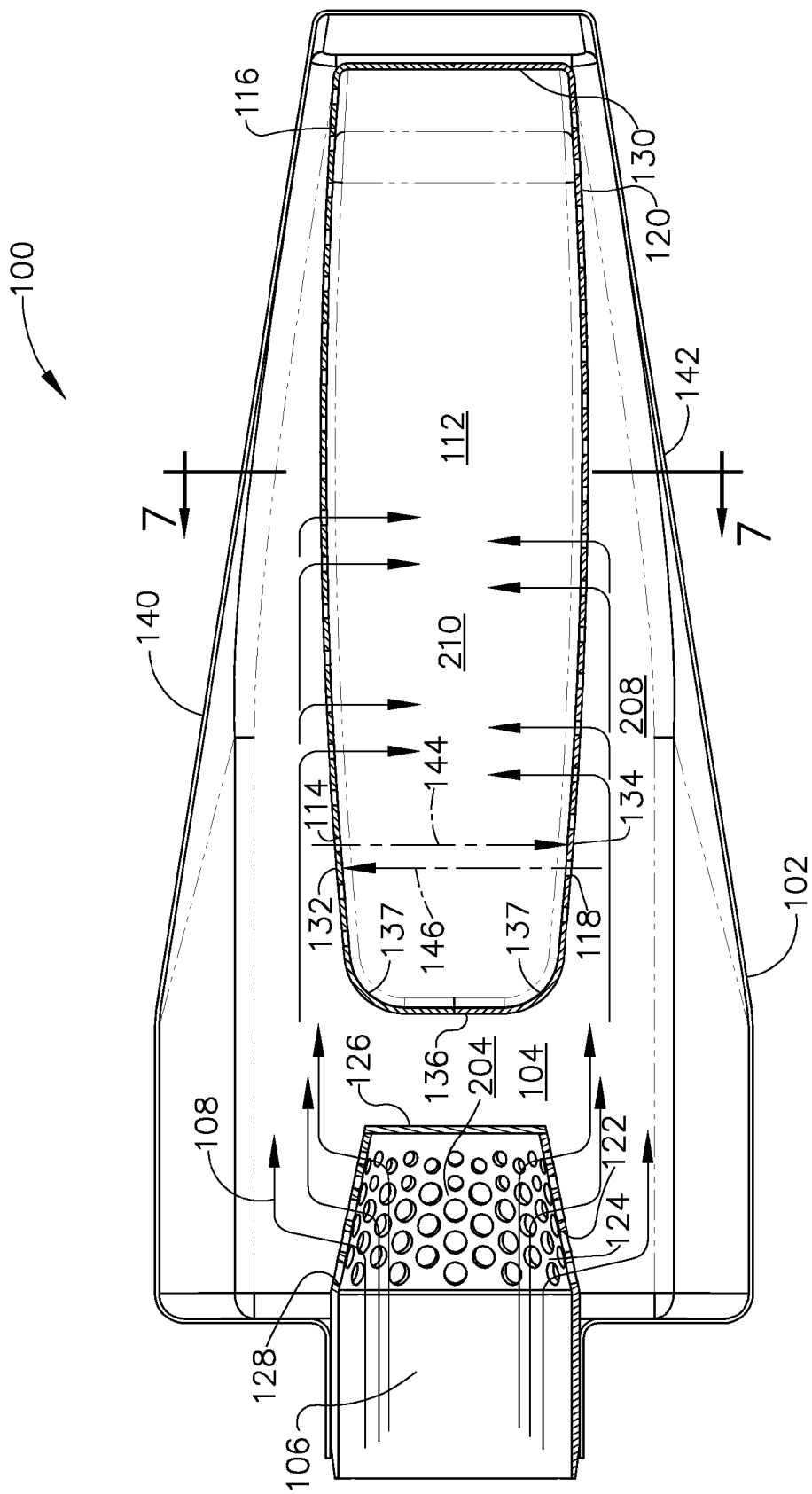
FIG. 6 is a cross-sectional plan view of an example muffling device.

FIG. 6 is a cross-sectional plan view of an example muffling device 100, according to at least some aspects of the present disclosure. Flow 108 may enter muffling device 100 through inlet 106. Flow 108 may be directed from inlet 106 into interior 104 of muffling device body 102 via inlet flow restrictor 122, such as via holes 128 in side wall 124. Flow 108 may be directed along the outer sides (e.g., along orifice plate 116 and orifice plate 120) of plenum 112, such as by downstream end wall 126 of inlet flow restrictor and/or upstream end wall 136 of plenum 112. Upstream end wall 136 of plenum 112 may include rounded corners 137 connecting to orifice plate 116 and/or orifice plate 120, which may aid in smoothly directing flow 108.

Interior 104 of muffling device body 102 may be at least partially defined by side wall 140 and side wall 142, which may taper inwardly in a generally downstream direction. Muffling device body 102 may be generally widest at an upstream end near inlet 106 and/or may be generally narrowest at a downstream end near downstream end wall 130 of plenum 112. In some example embodiments, such tapering may provide a substantially uniform static pressure distribution, which may provide a substantially even flow distribution.

In some example embodiments, orifice plate 116 and orifice plate 120 may create a cross-impinging flow into plenum 112. For example, an axis 144 of orifice 114 of first orifice plate 116 may not be coaxial with an axis 146 of orifice 118 of second orifice plate 120. As a result, flow through orifice 114 of first orifice plate 116 may generally impinge on wall 134 of second orifice plate 120 and/or flow through orifice 118 of second orifice plate 120 may generally impinge on wall 132 of first orifice plate 116.

Figure 7:
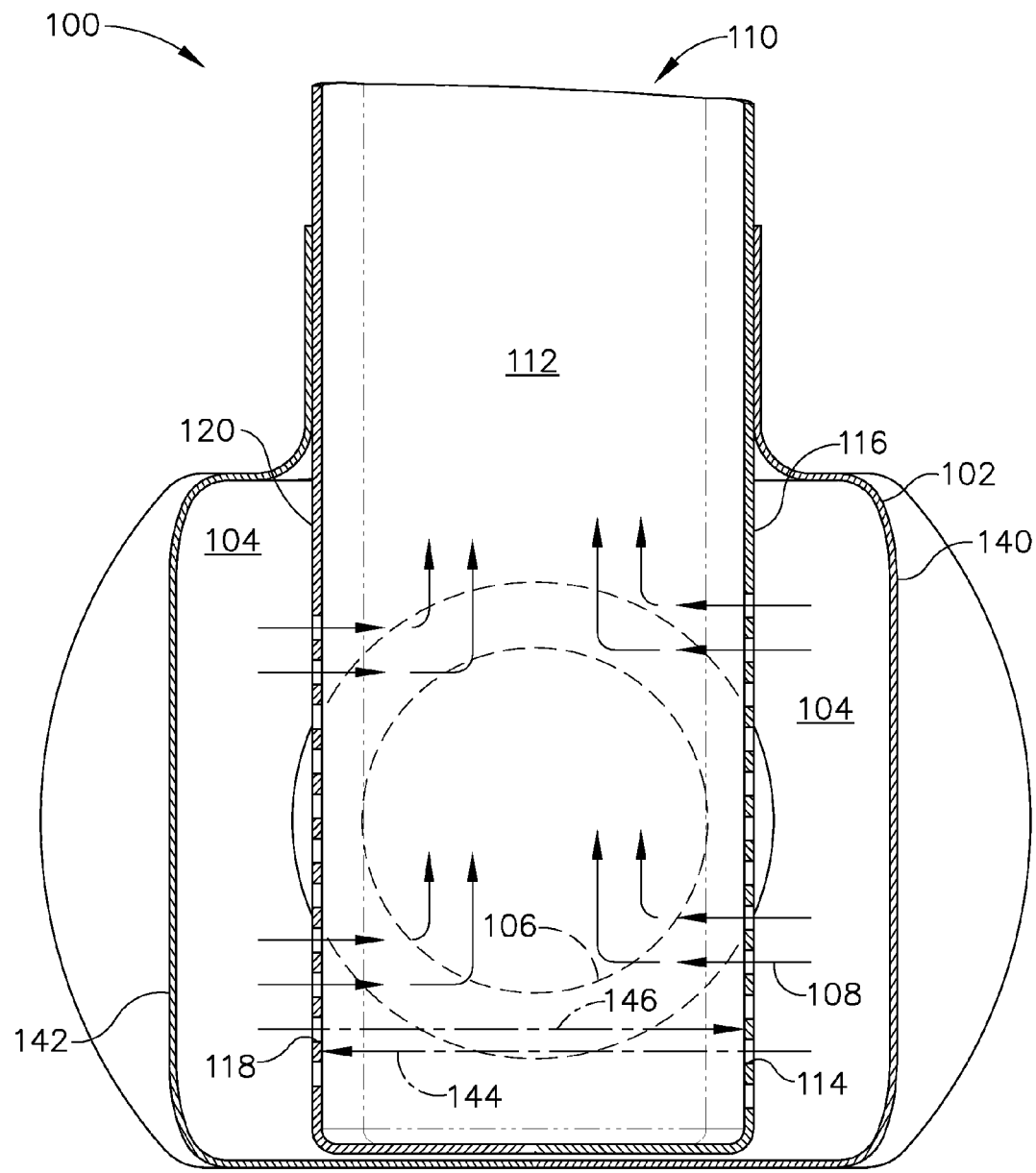
FIG. 7 is a cross-sectional view of an example muffling device.

In some example embodiments, first orifice plate 116 and second orifice plate 120 may be disposed within interior 104 of muffling device body 102 such that flow 108 from interior 104 through orifices 114 of first orifice plate 116 and/or flow through orifices 118 of second orifice plate 120 substantially changes direction (see, e.g., FIG. 7). For example, flow from interior 104 (e.g., generally from inlet flow restrictor 122) through orifices 114 and/or orifices 118 may change direction by about 90 degrees.

In an example embodiment operating at a design flow condition, static pressures at various points may be as follows: point 204 about 1100 kPa; point 208 about 345 kPa; point 210 about 160 kPa (FIGS. 6 and 7).

FIG. 7 is a cross-sectional view of an example muffling device 100, according to at least some aspects of the present disclosure. First orifice plate 116, second orifice plate 120, and plenum 112 may be arranged such that flow 108 through orifices 114 of first orifice plate 116 into plenum 112 and/or flow through orifices 118 of second orifice plate 120 into plenum 112 substantially changes direction. For example, through orifices 114 and/or orifices 118 (e.g., from interior 104 of muffling device body 102) into plenum 112 may change direction by about 90 degrees.

In some example embodiments, flow through first orifice plate 116 and/or second orifice plate 120 may not be choked. In some example embodiments, flow through first orifice plate 116 and/or second orifice plate 120 may be choked.

In some example embodiments, an effective flow area of first orifice plate 116 and second orifice plate 118 may be greater than an effective flow area of inlet flow restrictor 122. In some example embodiments, an effective flow area of outlet 110 may be greater than the effective flow area of first orifice plate 116 and second orifice plate 118.

Figure 8:
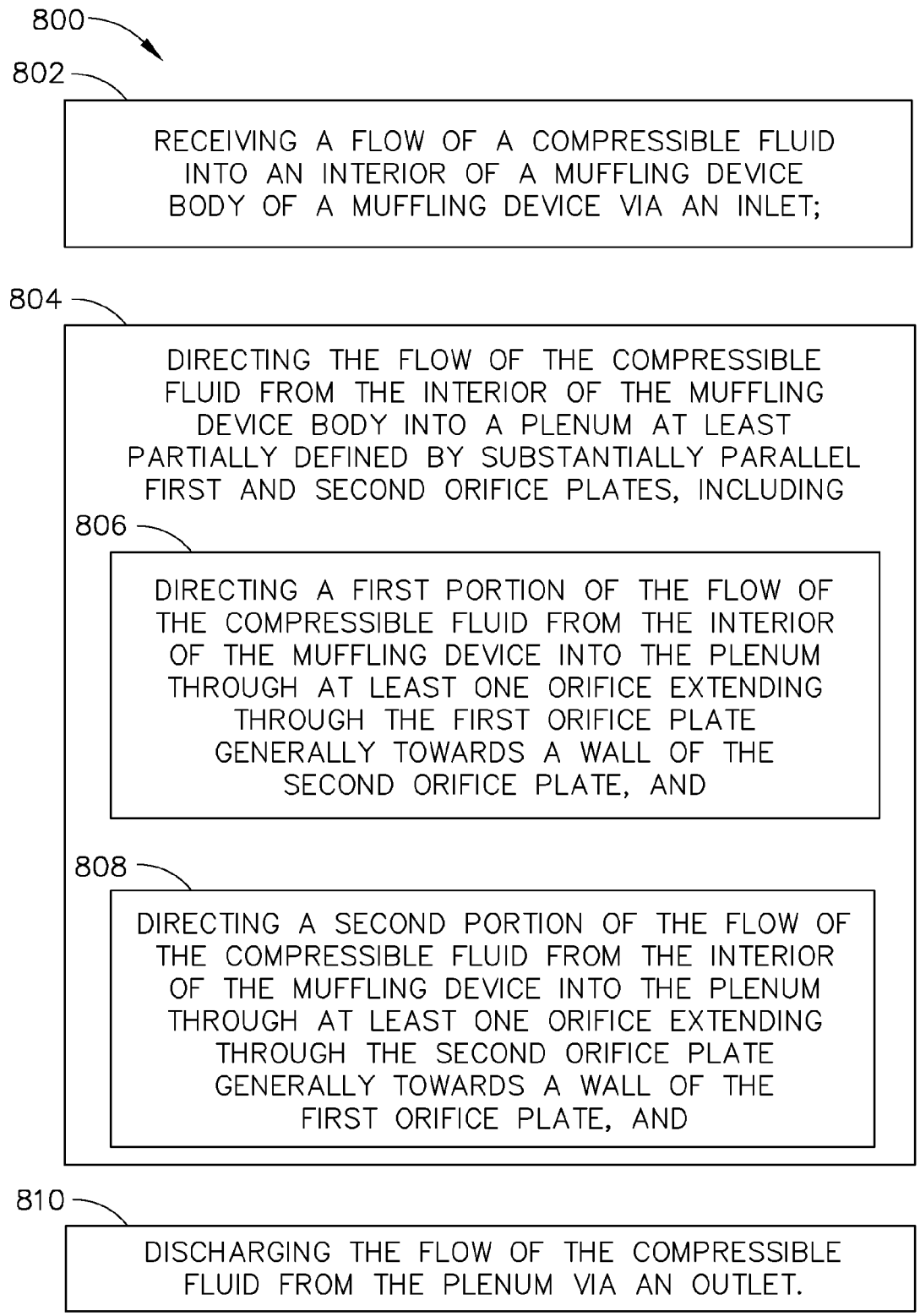
FIG. 8 is flow chart of an example method of operating a muffling device.

FIG. 8 is flow chart of an example method 800 of operating a muffling device, according to at least some aspects of the present disclosure. Method 800 may include an operation 802, which may include receiving a flow of a compressible fluid into an interior of a muffling device body of a muffling device via an inlet. Operation 802 may be followed by an operation 804. Operation 804 may include directing the flow of the compressible fluid from the interior of the muffling device body into a plenum at least partially defined by substantially parallel first and second orifice plates. Operation 804 may include operation 806, which may include directing a first portion of the flow of the compressible fluid from the interior of the muffling device into the plenum through at least one orifice extending through the first orifice plate generally towards a wall of the second orifice plate. Operation 804 may include operation 808, which may include directing a second portion of the flow of the compressible fluid from the interior of the muffling device into the plenum through at least one orifice extending through the second orifice plate generally towards a wall of the first orifice plate. Operation 804 may be followed by an operation 810. Operation 810 may include discharging the flow of the compressible fluid from the plenum via an outlet.

Figures 10, 11:
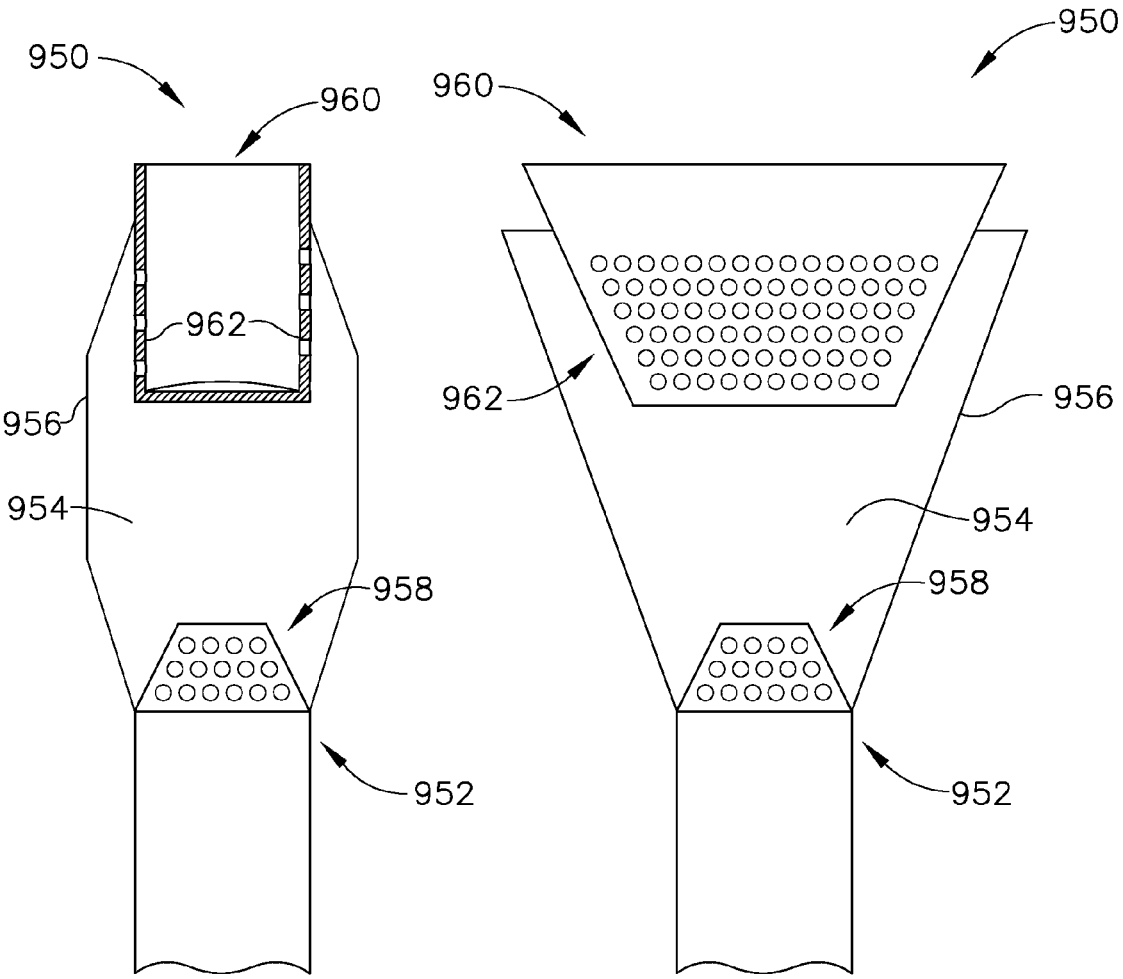
FIG. 10 is a schematic cross-sectional view of an alternative example muffling device.
FIG. 11 is a schematic cross-sectional view of an alternative example muffling device.

FIG. 10 is a schematic cross-sectional view of an alternative example muffling device 950 and FIG. 11 is a schematic cross-sectional view of an alternative example muffling device 950, according to at least some aspects of the present disclosure. Muffling device 950 may include an inlet 952, which may receive bleed air 2 (FIG. 1). Inlet 952 may deliver bleed air 2 to an interior 954 of a muffling device body 956 via an inlet flow restrictor 958. Air may flow from interior 954 to an outlet 960 via one or more orifice plates 962, which may be arranged to produce a cross-impinging flow. Generally, muffling device 950 may be similar to muffling device 100 described above.

Some example embodiments according to at least some aspects of the present disclosure may be constructed in a modular form. For example, an embodiment may include an inlet flow restrictor 122, at one orifice plate 116, 120, and/or both an inlet flow restrictor 122 and one or more orifice plates 116, 120. Some embodiments may be readily reconfigurable, such as by being assembled using removable fasteners.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A muffling device, comprising:
    a muffling device body comprising an inlet arranged to direct a flow of a compressible fluid into an interior of the muffling device body;
    a first orifice plate arranged to receive the at least some of the flow of the compressible fluid from the interior of the muffling device body, the first orifice plate comprising at least one orifice extending through a wall; and
    a second orifice plate arranged to receive the at least some of the flow of the compressible fluid from the interior of the muffling device body, the second orifice plate comprising at least one orifice extending through a wall;
    wherein the first orifice plate and the second orifice plate at least partially define a plenum arranged to receive the flow of the compressible fluid from the interior of the muffling device body via the at least one orifice of the first orifice plate and via the at least one orifice of the second orifice plate;
    wherein the first orifice plate and the second orifice plate are fluidicly opposed such that the flow of the compressible fluid through the at least one orifice of the first orifice plate from the interior of the muffling device body into the plenum is directed at the wall of the second orifice plate and such that flow of the compressible fluid through the at least one orifice of the second orifice plate from the interior of the muffling device body into the plenum is directed at the wall of the first orifice plate;
    wherein the inlet is fluidicly coupled to a bleed system associated with a gas turbine engine; and
    wherein the plenum is arranged to discharge into a fan flow stream of the gas turbine engine.

2. The muffling device of claim 1, wherein an axis of the at least one orifice of the first orifice plate is not coaxial with an axis of the at least one orifice of the second orifice plate.

3. The muffling device of claim 1, further comprising an inlet flow restrictor disposed fluidicly downstream of the inlet and fluidicly upstream of the interior of the muffling device body.

4. The muffling device of claim 3, wherein the inlet flow restrictor comprises a plurality of orifices arranged in a generally staggered arrangement.

5. The muffling device of claim 3,
    wherein the inlet flow restrictor comprises a generally conical frustum comprising a side wall and a downstream end wall, the conical frustum tapering inwardly in a generally downstream direction; and
    wherein the side wall comprises a plurality of holes extending therethrough arranged to direct the flow of the compressible fluid into the interior of the muffling device body.

6. The muffling device of claim 5, wherein the downstream end wall comprises a plurality of holes extending therethrough arranged to direct the flow of the compressible fluid into the interior of the muffling device body.

7. The muffling device of claim 1,
    wherein the plenum comprises an outlet arranged to discharge the flow of the compressible fluid; and
    wherein the plenum tapers outwardly in a direction generally towards the outlet.

8. The muffling device of claim 1, wherein the first orifice plate and the second orifice plate are disposed within the interior of the muffling device body such that the flow of the compressible fluid from the interior of the muffling device body through the at least one orifice of the first orifice plate changes direction by about 90 degrees and the flow of the compressible fluid from the interior of the muffling device body through the at least one orifice of the second orifice plate changes direction by about 90 degrees.

9. The muffling device of claim 1, wherein the plenum is disposed between the first orifice plate and the second orifice plate such that the flow of the compressible fluid through the at least one orifice of the first orifice plate into the plenum changes direction by about 90 degrees and the flow of the compressible fluid through the at least one orifice of the second orifice plate into the plenum changes direction by about 90 degrees.

10. A method of operating a muffling device, the method comprising:
    receiving a flow of a compressible fluid into an interior of a muffling device body of a muffling device via an inlet, wherein receiving the flow of the compressible fluid into the interior of the muffling device body comprises receiving bleed air discharged from a compressor of a gas turbine engine;
    directing the flow of the compressible fluid from the interior of the muffling device body into a plenum at least partially defined by substantially parallel first and second orifice plates, including directing a first portion of the flow of the compressible fluid from the interior of the muffling device into the plenum through at least one orifice extending through the first orifice plate generally towards a wall of the second orifice plate, and directing a second portion of the flow of the compressible fluid from the interior of the muffling device into the plenum through at least one orifice extending through the second orifice plate generally towards a wall of the first orifice plate; and discharging the flow of the compressible fluid from the plenum via an outlet.

11. The method of claim 10,
wherein directing a first portion of the flow of the compressible fluid from the interior of the muffling device into the plenum through at least one orifice extending through the first orifice plate generally towards a wall of the second orifice plate comprises impinging the first portion of the flow of the compressible fluid on the wall of the second orifice plate; and wherein directing a second portion of the flow of the compressible fluid from the interior of the muffling device into the plenum through at least one orifice extending through the second orifice plate generally towards a wall of the first orifice plate comprises impinging the second portion of the flow of the compressible fluid on the wall of the first orifice plate.

12. The method of claim 10, wherein receiving a flow of a compressible fluid into the interior of the muffling device body comprises directing the flow of the compressible fluid through an inlet flow restrictor fluidicly interposing an inlet of the muffling device body and the interior of the muffling device body.

13. The method of claim 12, wherein directing the flow of the compressible fluid through the inlet flow restrictor comprises directing the flow of the compressible fluid through a plurality of holes extending through a sidewall of the inlet flow restrictor, the inlet flow restrictor comprising a generally conical frustrum comprising the side wall and a downstream end wall, the conical frustrum tapering inwardly in a generally downstream direction.

14. The method of claim 12, wherein directing the flow of the compressible fluid through the inlet flow restrictor comprises causing flow sufficient to create a choked condition at the inlet flow restrictor.

15. A muffling device, comprising:
a muffling device body comprising an inlet arranged to direct a flow of a compressible fluid into an interior of the muffling device body;
a first orifice plate arranged to receive the at least some of the flow of the compressible fluid from the interior of the muffling device body, the first orifice plate comprising at least one orifice extending through a wall; and
a second orifice plate arranged to receive the at least some of the flow of the compressible fluid from the interior of the muffling device body, the second orifice plate comprising at least one orifice extending through a wall;
wherein the first orifice plate and the second orifice plate at least partially define a plenum arranged to receive the flow of the compressible fluid from the interior of the muffling device body via the at least one orifice of the first orifice plate and via the at least one orifice of the second orifice plate;
wherein the first orifice plate and the second orifice plate are fluidicly opposed such that the flow of the compressible fluid through the at least one orifice of the first orifice plate from the interior of the muffling device body into the plenum is directed at the wall of the second orifice plate and such that flow of the compressible fluid through the at least one orifice of the second orifice plate from the interior of the muffling device body into the plenum is directed at the wall of the first orifice plate;
wherein the plenum comprises an outlet arranged to discharge the flow of the compressible fluid; wherein the plenum tapers outwardly in a direction generally towards the outlet; and
wherein the inlet is fluidicly coupled to a bleed system associated with a gas turbine engine.

16. The muffling device of claim 15,
further comprising an inlet flow restrictor disposed fluidicly downstream of the inlet and fluidicly upstream of the interior of the muffling device body;
wherein the inlet flow restrictor comprises a generally conical frustrum comprising a side wall and a downstream end wall, the conical frustrum tapering inwardly in a generally downstream direction; and
wherein the side wall comprises a plurality of holes extending therethrough arranged to direct the flow of the compressible fluid into the interior of the muffling device body.

17. The muffling device of claim 15, wherein the first orifice plate and the second orifice plate are disposed within the interior of the muffling device body such that the flow of the compressible fluid from the interior of the muffling device body through the at least one orifice of the first orifice plate changes direction by about 90 degrees and the flow of the compressible fluid from the interior of the muffling device body through the at least one orifice of the second orifice plate changes direction by about 90 degrees.

18. The muffling device of claim 15, wherein the plenum is disposed between the first orifice plate and the second orifice plate such that the flow of the compressible fluid through the at least one orifice of the first orifice plate into the plenum changes direction by about 90 degrees and the flow of the compressible fluid through the at least one orifice of the second orifice plate into the plenum changes direction by about 90 degrees.

19. A method of operating a muffling device, the method comprising:
receiving a flow of a compressible fluid into an interior of a muffling device body of a muffling device via an inlet, wherein receiving the flow of the compressible fluid into the interior of the muffling device body comprises receiving bleed air discharged from a compressor of a gas turbine engine, wherein receiving the flow of the compressible fluid into the interior of the muffling device body further comprises directing the flow of the compressible fluid through an inlet flow restrictor fluidicly interposing the inlet of the muffling device body and the interior of the muffling device body, wherein directing the flow of the compressible fluid through the inlet flow restrictor comprises directing the flow of the compressible fluid through a plurality of holes extending through a sidewall of the inlet flow restrictor, the inlet flow restrictor comprising a generally conical frustrum comprising the side wall and a downstream end wall, the conical frustrum tapering inwardly in a generally downstream direction;

directing the flow of the compressible fluid from the interior of the muffling device body into a plenum at least partially defined by substantially parallel first and second orifice plates, including directing a first portion of the flow of the compressible fluid from the interior of the muffling device into the plenum through at least one orifice extending through the first orifice plate generally towards a wall of the second orifice plate, and directing a second portion of the flow of the compressible fluid from the interior of the muffling device into the plenum through at least one orifice extending through the second orifice plate generally towards a wall of the first orifice plate; and discharging the flow of the compressible fluid from the plenum via an outlet.

20. The method of claim 19, wherein directing the first portion of the flow of the compressible fluid from the interior of the muffling device into the plenum through the at least one orifice extending through the first orifice plate generally towards the wall of the second orifice plate comprises impinging the first portion of the flow of the compressible fluid on the wall of the second orifice plate; and wherein directing the second portion of the flow of the compressible fluid from the interior of the muffling device into the plenum through the at least one orifice extending through the second orifice plate generally towards the wall of the first orifice plate comprises impinging the second portion of the flow of the compressible fluid on the wall of the first orifice plate.

21. The method of claim 19, wherein directing the flow of the compressible fluid through the inlet flow restrictor comprises causing flow sufficient to create a choked condition at the inlet flow restrictor.

* * * * *